(12) United States Patent
Bui et al.

(10) Patent No.: US 8,493,682 B2
(45) Date of Patent: Jul. 23, 2013

(54) HEAD WRAP PROCEDURE

(75) Inventors: Nhan X. Bui, Tucson, AZ (US); Ernest S. Gale, Tucson, AZ (US); Reed A. Hancock, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/115,903

(22) Filed: May 25, 2011

(65) Prior Publication Data

US 2012/0300337 A1 Nov. 29, 2012

(51) Int. Cl.
*G09B 15/078* (2006.01)
(52) U.S. Cl.
USPC .......................................................... 360/71
(58) Field of Classification Search
None
See application file for complete search history.

(56) References Cited

U.S. PATENT DOCUMENTS

| 7,414,811 | B2 | 8/2008 | Biskeborn |
| 2005/0237652 | A1* | 10/2005 | Biskeborn ....................... 360/71 |
| 2009/0268343 | A1 | 10/2009 | Biskeborn et al. |

OTHER PUBLICATIONS

U.S. Appl. No. 12/831,149, filed on Jul. 6, 2010.

\* cited by examiner

*Primary Examiner* — Paul Huber
(74) *Attorney, Agent, or Firm* — Zilka-Kotab, PC

(57) ABSTRACT

According to one embodiment, a method includes tracking a magnetic tape moving in a first direction using at least one reader of an inner module of a head having at least the inner module and first and second outer modules positioned on opposite sides of the inner module and aligned with the inner module in a tape travel direction, detecting a signal using at least one reader of the first outer module as the tape passes thereacross, moving a guide positioned in front of the first outer module in a direction towards the tape until the signal detected by the first outer module decreases by a predetermined amount, and moving the guide directionally away from the tape to a position to set about a predetermined wrap angle of the tape relative to the first outer module after the signal detected by the first outer module decreases by the predetermined amount.

19 Claims, 8 Drawing Sheets

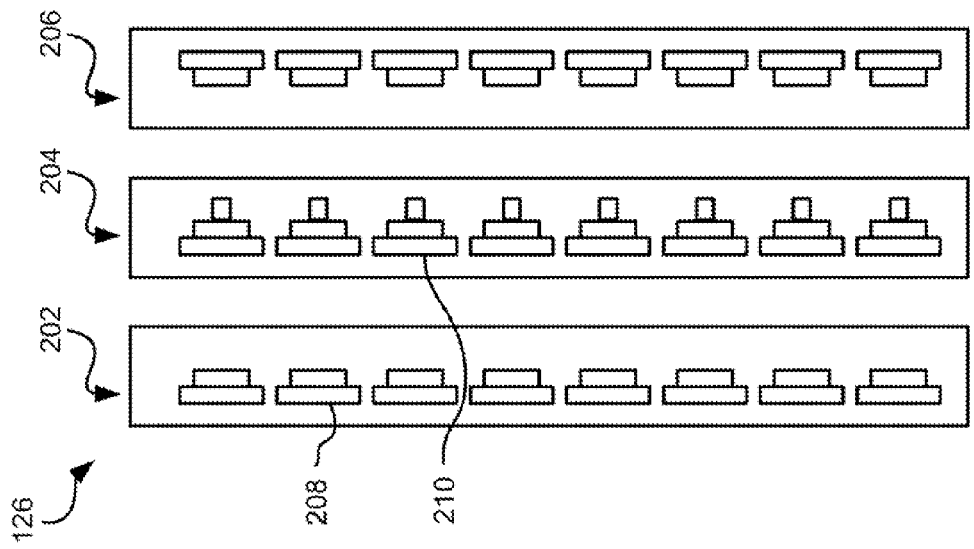
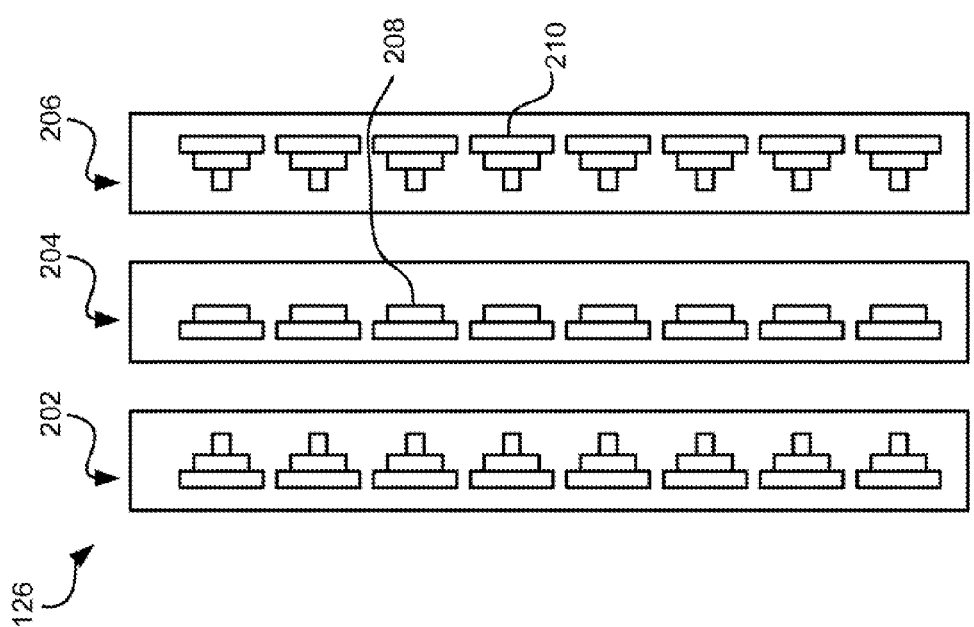

HEAD WRAP PROCEDURE

BACKGROUND

The present invention relates to magnetic tape storage systems, and more specifically, this invention relates to methods for wrapping a multi-module head.

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in thousands of gigabytes on 2000 or more data tracks.

An important and continuing goal in the data storage industry is that of increasing the density of data stored on a medium. For tape storage systems, that goal has led to increasing the track density on recording tape, and decreasing the thickness of the magnetic tape medium. However, the development of higher performance tape drive systems has created various problems in the design and manufacture of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

Typical tape heads used, for example, in the Linear Tape Open (LTO) standard are designed such that the tape must properly wrap the head to establish the proper head to tape distance. This is accomplished by using a skiving edge on the head to bleed off and prevent air from getting between the head and tape which would disrupt increase the head-tape spacing. Thus, for proper functionality, the tape must be properly wrapped around the tape head at precise angles with tight angle tolerances.

BRIEF SUMMARY

In one embodiment, a method includes tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction, detecting a signal using at least one reader of the first outer module as the tape passes thereacross, moving a first guide positioned in front of the first outer module in a direction towards the tape until the signal detected by the first outer module decreases by a predetermined amount, and moving the first guide in a direction away from the tape to a position to set about a predetermined wrap angle of the tape relative to the first outer module after the signal detected by the first outer module decreases by the predetermined amount.

In another embodiment, a method includes tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction, detecting a signal using at least one reader of the first outer module as the tape passes thereacross, moving a first guide positioned in front of the first outer module in a direction towards the tape until the signal detected by the first outer module decreases by a predetermined amount, moving the first guide in a direction away from the tape to a position to set about a predetermined wrap angle of the tape relative to the first outer module after the signal detected by the first outer module decreases by the predetermined amount, tracking the magnetic tape moving in a second direction opposite the first direction using at least one reader of the inner module of the head or a second inner module of the head, wherein the second outer module is a leading module when the tape travels in the second direction, detecting a signal using at least one reader of the second outer module, moving a second guide positioned in front of the second outer module in a direction towards the tape until the signal detected by the second outer module decreases by a predetermined amount, and moving the second guide in a direction away from the tape to a position that sets about a predetermined wrap angle of the tape relative to the second outer module after the signal detected by the second outer module decreases by the predetermined amount, wherein the tape bearing surfaces of the outer and inner modules lie along parallel planes.

In yet another embodiment, a system includes hardware configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge, the hardware comprising an output device for outputting an indication of a signal detected by the tape drive using at least one reader of the first outer module as the tape passes thereacross, logic configured to output an indication that the signal detected by the first outer module decreases by a predetermined amount as a first guide of the tape drive positioned in front of the first outer module is moved in a direction towards the tape, and logic configured to output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

In still yet another embodiment, a computer program product includes a computer readable storage medium having computer readable program code embodied therewith. The computer readable program code is configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge, output an indication of a signal detected by the tape drive using at least one reader of the first outer module as the tape passes thereacross, output an indication that the signal detected by the first outer module decreases by a predetermined amount as a first guide of the tape drive positioned in front of the first outer module is moved in a direction towards the tape, and output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 2A is a partial tape bearing surface view of a magnetic head having a write-read-write configuration.

FIG. 2B is a partial tape bearing surface view of a magnetic head having a read-write-read configuration.

DETAILED DESCRIPTION

Figure 1:
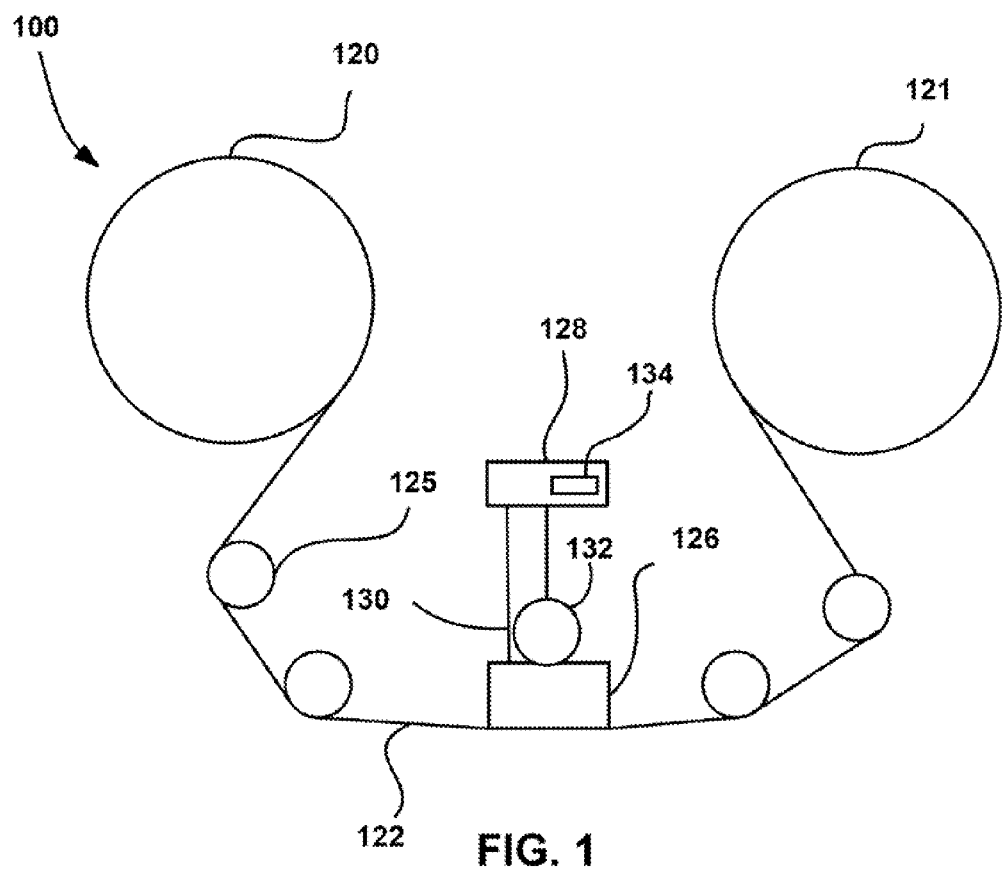
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of processes for setting a wrap angle of a multi-module head.

In one general embodiment, a method includes tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction, detecting a signal using at least one reader of the first outer module as the tape passes thereacross, moving a first guide positioned in front of the first outer module in a direction towards the tape until the signal detected by the first outer module decreases by a predetermined amount, and moving the first guide in a direction away from the tape to a position to set about a predetermined wrap angle of the tape relative to the first outer module after the signal detected by the first outer module decreases by the predetermined amount.

In another general embodiment, a method includes tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction, detecting a signal using at least one reader of the first outer module as the tape passes thereacross, moving a first guide positioned in front of the first outer module in a direction towards the tape until the signal detected by the first outer module decreases by a predetermined amount, moving the first guide in a direction away from the tape to a position to set about a predetermined wrap angle of the tape relative to the first outer module after the signal detected by the first outer module decreases by the predetermined amount, tracking the magnetic tape moving in a second direction opposite the first direction using at least one reader of the inner module of the head or a second inner module of the head, wherein the second outer module is a leading module when the tape travels in the second direction, detecting a signal using at least one reader of the second outer module, moving a second guide positioned in front of the second outer module in a direction towards the tape until the signal detected by the second outer module decreases by a predetermined amount, and moving the second guide in a direction away from the tape to a position that sets about a predetermined wrap angle of the tape relative to the second outer module after the signal detected by the second outer module decreases by the predetermined amount, wherein the tape bearing surfaces of the outer and inner modules lie along parallel planes.

In yet another general embodiment, a system includes hardware configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge, the hardware comprising an output device for outputting an indication of a signal detected by the tape drive using at least one reader of the first outer module as the tape passes thereacross, logic configured to output an indication that the signal detected by the first outer module decreases by a predetermined amount as a first guide of the tape drive positioned in front of the first outer module is moved in a direction towards the tape, and logic configured to output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

In still yet another general embodiment, a computer program product includes a computer readable storage medium having computer readable program code embodied therewith. The computer readable program code is configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge, output an indication of a signal detected by the tape drive using at least one reader of the first outer module as the tape passes thereacross, output an indication that the signal detected by the first outer module decreases by a predetermined amount as a first guide of the tape drive positioned in front of the first outer module is moved in a direction towards the tape, and output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

The configuration of the tape head 126 according to one embodiment includes multiple modules, preferably three or more. In a write-read-write (W-R-W) head, outer writing modules flank a single reading module. As the names imply, the outer modules 202, 206 each include one or more arrays of writers 208 in a configuration, for example, as shown in FIG. 2A. Referring again to FIG. 1, the reading module 204 includes one or more arrays of readers 210 in a similar configuration. Variations of a multi-module head include a R-W-R head (as shown in FIG. 2B), a R-R-W head, a W-W-R head, etc. In yet other variations, one or more of the modules may have read/write pairs of transducers. Moreover, more than three modules may be present. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 3:
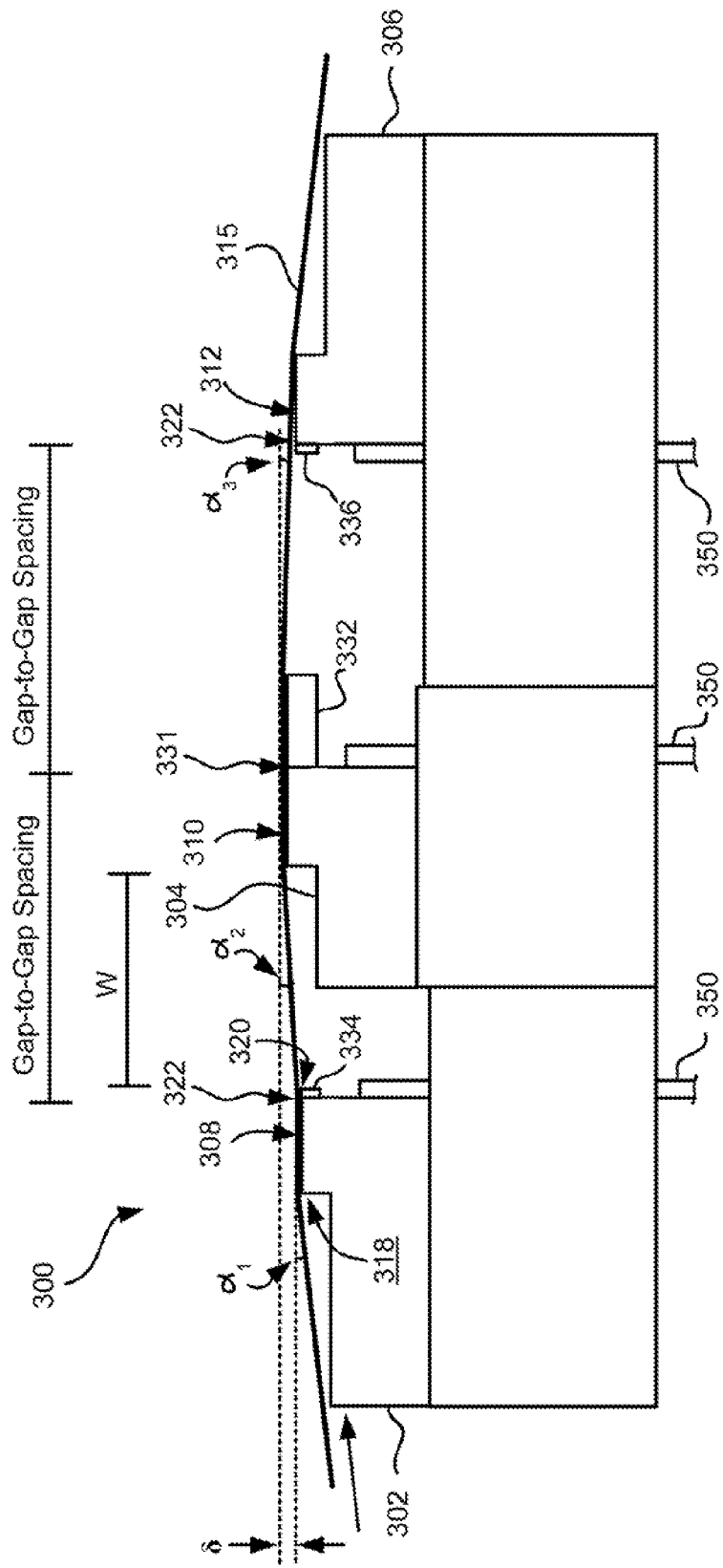
FIG. 3 is a side view of a magnetic tape head with three modules according to one embodiment where the modules all generally lie along parallel planes.

FIG. 3 illustrates a magnetic head 300 according to one embodiment of the present invention that includes first, second, and third modules 302, 304, 306 each having a flat profile tape bearing surface 308, 310, 312 respectively. Note that while the term "tape bearing surface" appears to imply that the surface facing the tape 315 is in physical contact with the tape bearing surface, this is not necessarily the case. Rather, it is more typical that a portion of the tape is in contact with the tape bearing surface, constantly or intermittently, and other portions of the tape ride above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

In this embodiment, the tape bearing surfaces 308, 310, 312 of the first, second and third modules 302, 304, 306 lie on parallel planes such that the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays close to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.7° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note also that because the tape bearing surfaces 308, 312 of the outer modules 302, 306 are lower than the tape bearing surface 310 of the second module 304, a negative wrap angle is achieved at the trailing edge 320 of the leading module 302. This is generally beneficial in helping to reduce wear of the trailing edge 320, provided that proper consideration is given to the location of the crowbar region that forms in the tape where it peels off the head. The negative wrap angle also reduces flutter and scrubbing damage to the elements on the leading module 302. Further, at the trailing module 306, the tape 315 flies over the tape bearing surface 312 so there is virtually no wear on the elements. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of standard writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, the tape irregularities tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 3, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, are preferably shorter than the closure 332 of the second module 304 as measured parallel to a direction of tape travel over the respective module. This enables setting the modules closer together. One way to produce the shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 mm, which in some embodiments is ideal for stabilizing tape motion over the second module 304.

Figure 4:
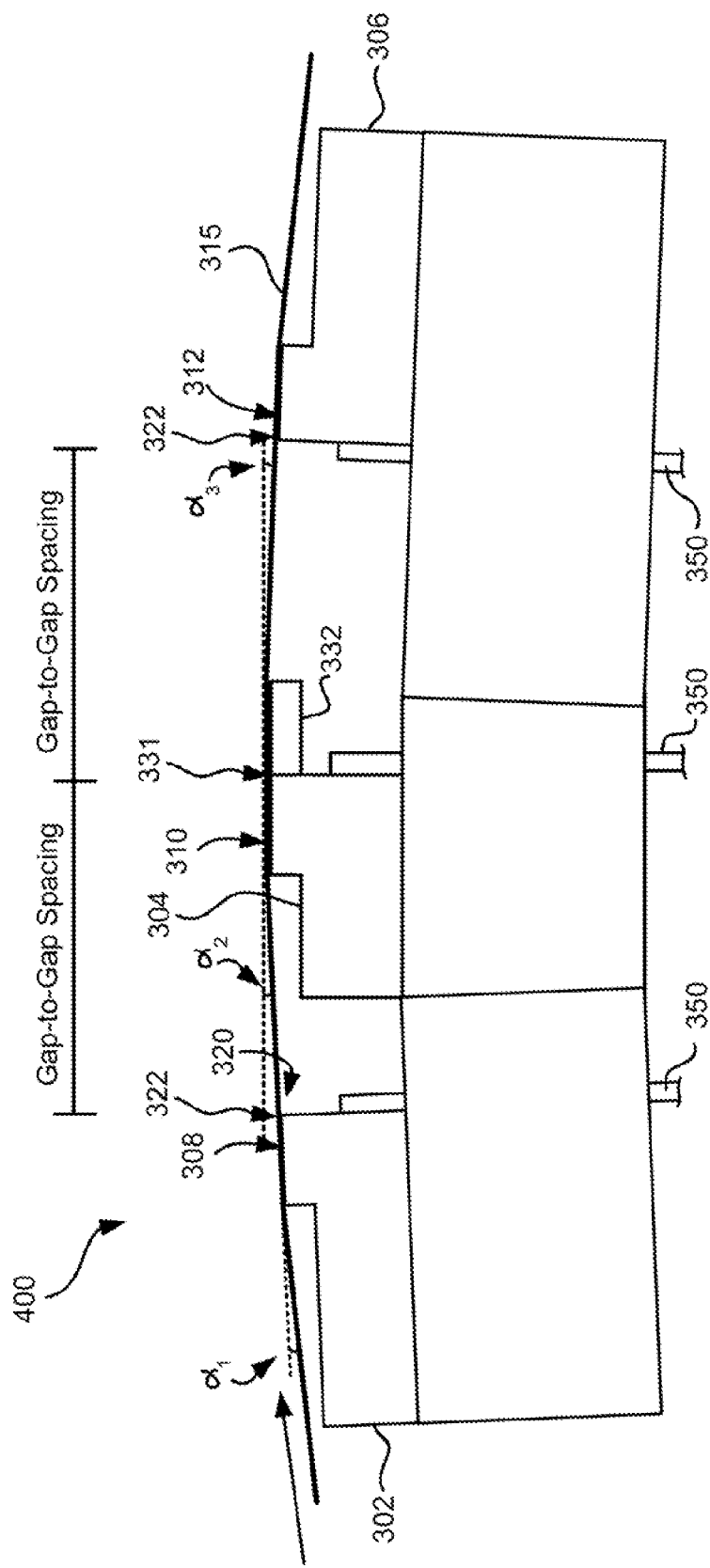
FIG. 4 is a side view of a magnetic tape head with three modules in a tangent (angled) configuration.

Depending on tape tension and stiffness, it may be desirable to angle the tape bearing surfaces of the outer modules relative to the tape bearing surface of the second module. FIG. 4 illustrates an embodiment 400 where the modules 302, 304, 306 are in a tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The inventor has found that the tape will also pop off of the trailing module 306 in this embodiment, thereby reducing wear on the elements in the trailing module 306. These embodiments are particularly adapted for write-read-write applications. Additional aspects of these embodiments are similar to those given above.

Figure 5:
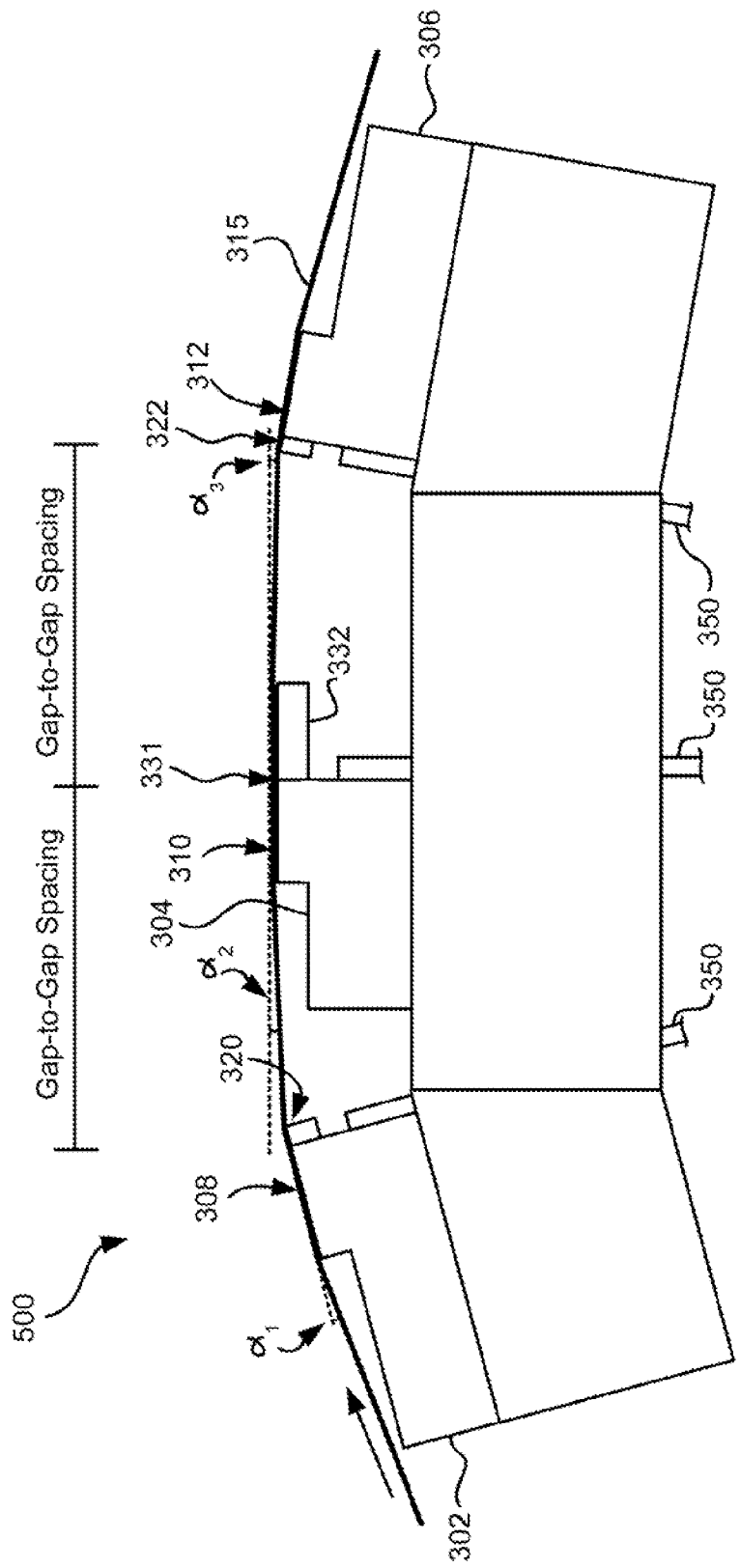
FIG. 5 is a side view of a magnetic tape head with three modules in an overwrap configuration.
Figure 6:
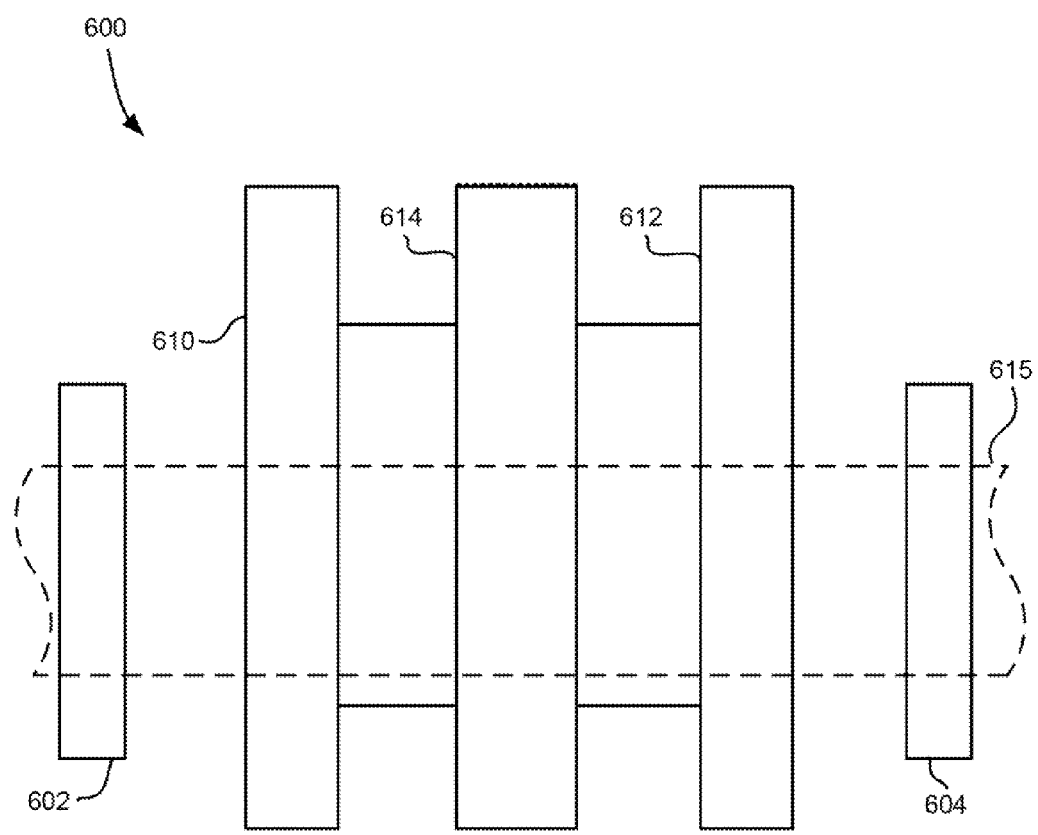
FIG. 6 is a side view of a magnetic tape system with three modules according to one embodiment of the present invention.
Figure 7:
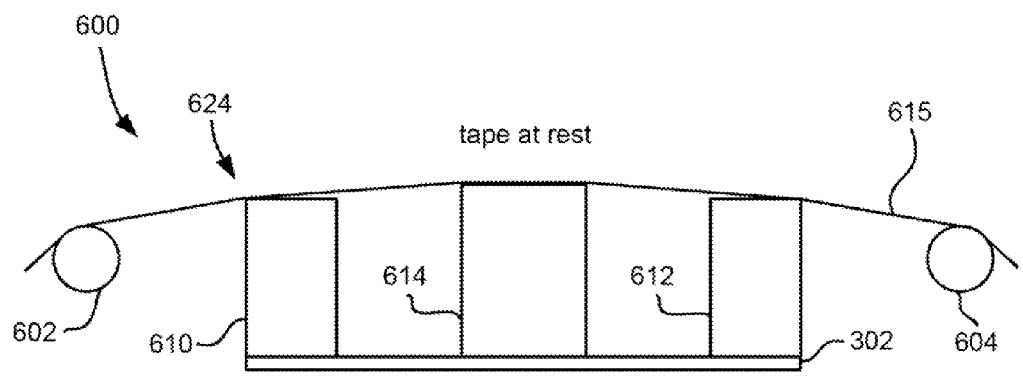
FIG. 7 is a side view of a magnetic tape system with three modules in use according to one embodiment of the present invention.

FIG. 5 illustrates an embodiment 500 where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore the preferred embodiment has a write-read-write configuration, which may use shortened closures that thus allow closer gap-to-gap separation.

Additional aspects of the embodiments shown in FIGS. 4 and 5 are similar to those given above. For example, in the embodiments of FIGS. 3, 4 and 5, the tape bearing surfaces of the outer modules lie below a plane extending across a tape bearing surface of the inner module.

To assemble any of the embodiments described above, conventional u-beam assembly can be used. Accordingly, the mass of the resultant head can be maintained or even reduced relative to heads of previous generations. As indicated, the tape bearing surface planes may be parallel. Since the tape pops off of the downstream writer, this has the advantage of eliminating tape reprofiling of the trailing writer module critical gap. This is possible because only the upstream writer need be used in either direction of tape motion.

A 32 channel version of this head may use cables 350 (referring back to FIG. 3) having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

For drive integration a two position skew plate is suggested to accommodate for small differences in writer-to-reader module alignment for left and right hand writers.

Benefits of the head configurations described herein include less debris accumulation. Also, the modules may be easier to manufacture as each module may require only readers or writers, and are therefore less susceptible to processing errors. Further, the heads may be simpler to design and assemble, especially where the tape bearing surfaces lie along parallel planes as in FIG. 3, as the modules may not need to be angled relative to each other. In addition, the recording gap widths may be reduced.

Any of the above embodiments or combinations of portions thereof can also be applied to any type of magnetic heads and magnetic recording systems, both known and yet to be invented. For example, the teachings herein are easily adaptable to interleaved heads, which typically include opposing modules each having an array of alternating readers and writers configured to provide read-while-write capability.

Referring to the embodiment 600 of FIG. 6-9, which may include a head as in any of FIGS. 1-5, the outer wrap angles $\alpha_1$ may be set in the drive, such as by guides 602, 604 of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

The outer wrap angles $\alpha_1$ and tolerances are typically on the order of about 0.5 to about 2 degrees, e.g., 1 degree with +/−0.1 degree tolerance. To establish this type of precision, the signals such as servo signals coming from the head while tape is moving across it, may be used to detect and monitor the tape to head wrap established during the drive manufacturing procedures.

In some approaches, the position of the guides may be set during manufacture and fixed, while in others the guides may be adjusted in the field, while in yet others, the guides may be set during manufacture and can be later adjusted in the field. Any known mechanism to fix the guides or make them adjustable may be used.

Figure 10:
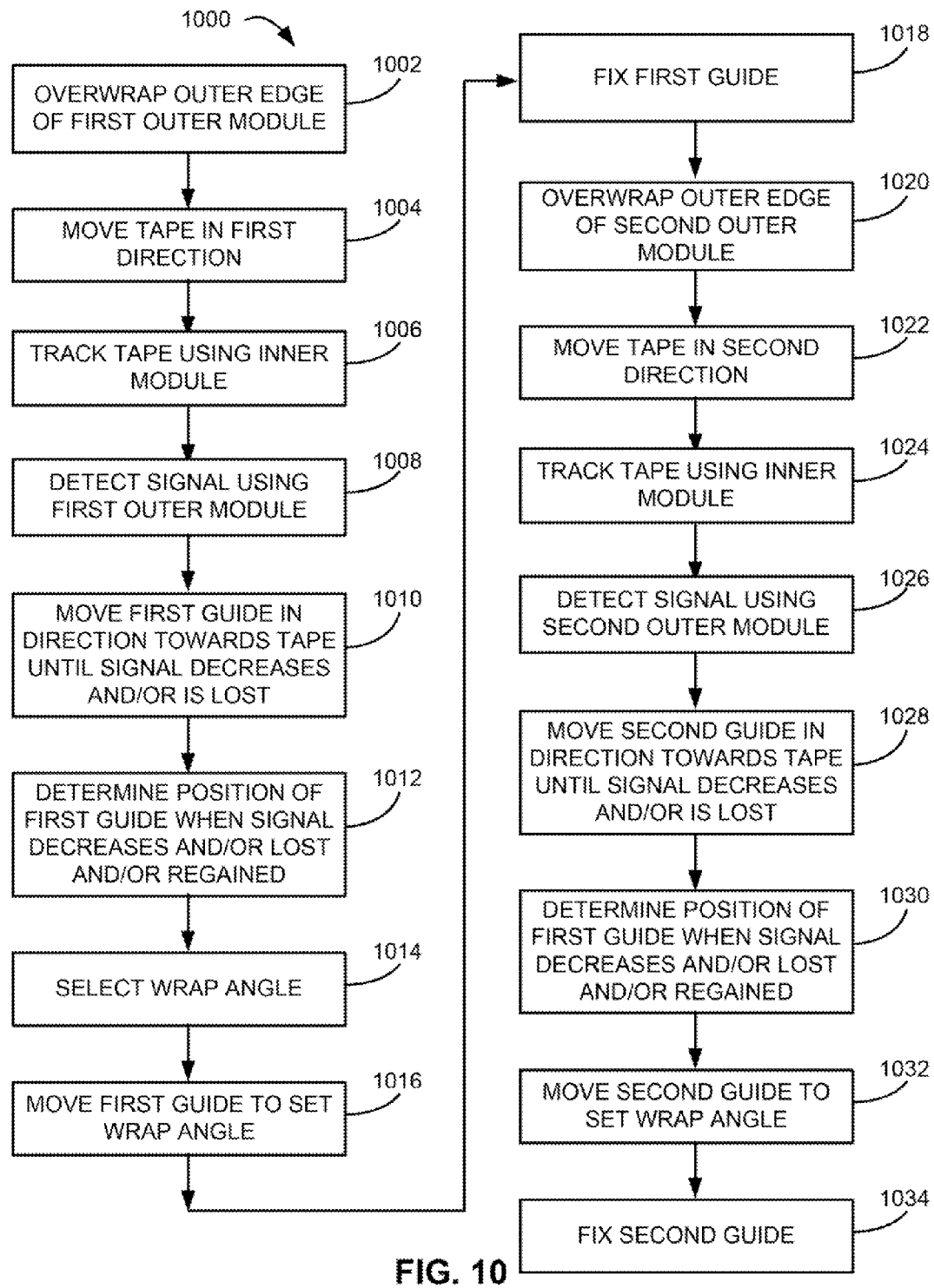
FIG. 10 is a flow diagram of a process according to one embodiment.

Referring to FIG. 10, a method 1000 for setting a wrap angle according to one embodiment is presented. The method 1000 may be used in conjunction with any embodiment presented herein, as well as the many permutations and variations thereof. Moreover, an actual implementation may include more or less steps than those presented here, such implementation falling with the scope and spirit of the present invention.

The method includes adjusting a guide position to over-wrap a magnetic tape over an outer edge of a leading outer module. See operation 1002. For example, in FIGS. 6-7, the guide 602 may be positioned to create an overwrap of the first outer module 610 at edge 624. The trailing guide 604 may or may not be in an overwrap configuration.

Figure 8:
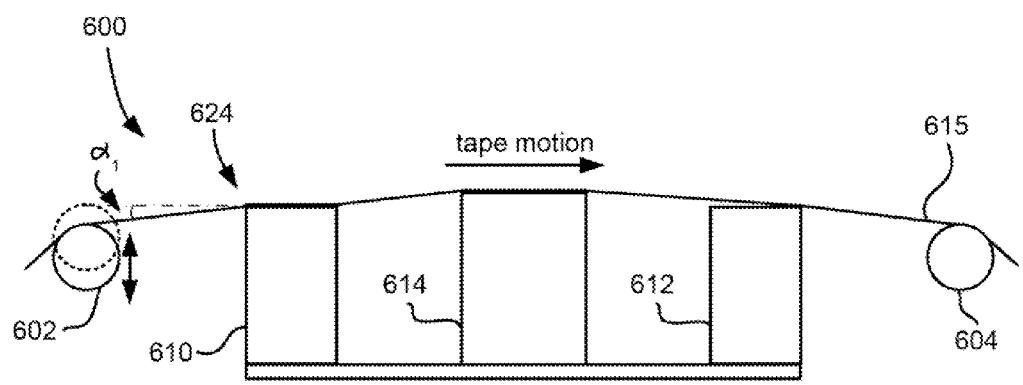
FIG. 8 is a side view of a magnetic tape system with three modules in use according to one embodiment of the present invention.

In operation 1004 of FIG. 10, and with reference to FIG. 8, the magnetic tape 615 is passed over the head, the tape traveling in a first direction from the first outer module 610 towards the second outer module 612.

In operation 1006 of FIG. 10, the magnetic tape is tracked, e.g., at least one track thereof is read, using at least one reader of the inner module 614. Tracking the magnetic tape in preferred approaches includes servo tracking using one or more servo readers of the inner module 614 and associated circuitry, in a manner known in the art. During tracking, the head may be moved by one or more actuators to follow a servo track being detected. In another approach, any track on the tape may be detected using the middle module, whether or not the head is actuated to follow the track or not. For example, one approach may use a servo reader detecting a servo track on the tape. Another approach may use a data reader detecting a data track on the tape, which may be a track with actual data, an AC erase track, etc. Yet another approach may use a data reader detecting a servo track on the tape.

Note that where multiple inner modules are present, any of the inner modules may be used for the tracking. In particularly preferred embodiments, the inner module closest to the leading module is used due to its proximity thereto.

The first outer module 610 in FIG. 8 is the leading module when the tape travels in the first direction.

In operation 1008 of FIG. 10, a signal e.g., a servo signal, data track signal, etc. is detected using at least one reader of the first outer module 610 as the tape 615 passes thereacross. See FIG. 8. For example, one approach may use a servo reader detecting a servo track on the tape. Another approach may use a data reader detecting a data track on the tape, which may be a track with actual data, an AC erase track, etc. Yet another approach may use a data reader detecting a servo track on the tape.

In operation 1010 of FIG. 10, and with reference to FIG. 8, the first guide 602, which is positioned in front of the first outer module, is moved in a direction towards the tape (upwards in FIG. 8) at least until the signal detected by the first outer module 610 decreases by a predetermined amount. In a preferred embodiment, the predetermined amount is about disappearance of the signal. However, complete disappearance of the signal is not necessary; rather, the movement may stop when the signal diminishes to some predetermined threshold. Operation 1010 is preferably performed while tracking the tape using the inner module.

In one illustrative approach, the first guide 602 is moved to alter a wrap angle of the magnetic tape 615 relative to the first outer module 610 until the tape is no longer readable. For example, the first guide 602 may be raised up until the tape pops off of the first outer module 610.

In operation 1012 of FIG. 10, the position of the first guide 602 is determined when and/or after the signal has decreased by the predetermined amount. If the signal disappears, this will generally correspond to an outer wrap angle $\alpha_1$ of about 0°. In one approach, this operation determines that the outer wrap angle $\alpha_1$ is about 0° when the signal is lost. In another approach, the first guide 602 is moved towards the tape until the signal is lost, then the first guide 602 is moved in the reverse direction until the signal is regained. This operation determines that the outer wrap angle $\alpha_1$ is about 0° when the signal is regained.

In either approach, it is desirable to maintain tracking, e.g., a servo lock using the inner module servo readers, and wrap and unwrap the outer modules, particularly where a servo signal on the outer modules is monitored to determine when the servo signal is gained and/or lost. If the head is not locked to the servo using the inner module, when the tape is lifted off of the head and then you placed back down, the tape may shift and the head may not see the servo signal at all, rendering it difficult to determine whether the tape has made contact with the head or not. However, it is known that the head has made contact (whether actual contact or near contact as present in a drive in use) with the tape when the servo signal is detected at the outer module. The middle module generally remains in contact with the tape.

In operation 1014, the "in use" outer wrap angle $\alpha_1$, to be used for data storage operations, is selected based on the determined position of the first guide 602.

In operation 1016, the first guide is moved in a direction away from the tape (down in FIG. 8) to a position to set about a predetermined wrap angle of the tape 615 relative to the first outer module 610. The tape may or may not be tracked during this operation. Tools known in the art may be used to set the desired wrap angle.

In operation 1018, the first guide 602 is fixed at the desired position, e.g., by tightening a screw, application of adhesive, etc.

As noted above, an illustrative "in use" outer wrap angle $\alpha_1$ between the tape in tension extending from the first guide 602 to the first outer module 610 the tape bearing surface of the outer portion may be 0° to about 2°, but could be higher. Thus, the selected wrap angle may be the same as or greater than the wrap angle provided by the first guide 602 when the tape becomes no longer readable.

Operations similar to 1002-1018 are performed to set the outer wrap angle relative to the second outer module 612.

Figure 9:
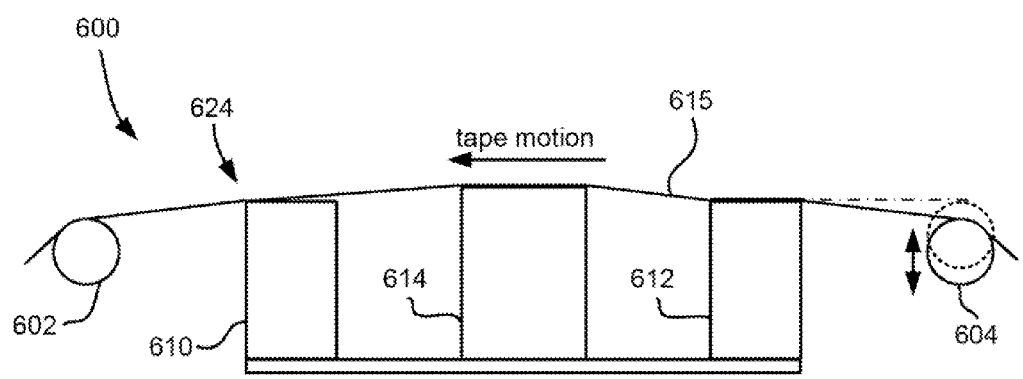
FIG. 9 is a side view of a magnetic tape system with three modules according to one embodiment of the present invention.

In operation 1020 of FIG. 10, and with reference to FIG. 9, the position of the second guide 604 is adjusted to overwrap the magnetic tape over the outer edge of the second outer module 612.

In operation 1022, the magnetic tape 615 is moved in a second direction opposite the first direction.

In operation 1024, the tape 615 is tracked using at least one reader of the inner module 614. In embodiments having more than one inner module, the tape may be tracked using a reader of a second inner module of the head.

In operation 1026 of FIG. 10, a signal e.g., a servo signal, data track signal, etc. is detected using at least one reader of the second outer module 612 as the tape 615 passes thereacross. See FIG. 9.

In operation 1028 of FIG. 10, and with reference to FIG. 9, the second guide 604, which is positioned in front of the second outer module 612, is moved in a direction towards the tape (upwards in FIG. 9) until the signal detected by the second outer module 612 decreases by a predetermined amount.

In operation 1030 of FIG. 10, the position of the second guide 604 when the signal has decreased by the predetermined amount is determined.

In operation 1032, the second guide is moved in a direction away from the tape (down in FIG. 8) to a position to set about a predetermined wrap angle of the tape 615 relative to the first outer module 610.

In operation 1034, the second guide 604 is fixed at the desired position, e.g., by tightening a screw, application of adhesive, etc.

Once the outer wrap angles are set, the drive may be ready for use. In one example of use, a method for writing data to a magnetic tape using a head as described above includes sending signals to writers on a first module having a flat profile tape bearing surface when the first module is a leading module with respect to a direction of tape travel. Signals from readers are received on a second module, e.g., an inner module, having a flat profile tape bearing surface. Signals are sent to writers on a third module having a flat profile tape bearing surface when the third module is a leading module with respect to a direction of tape travel.

Some embodiments of the present invention can take the form of a service that may include steps performed by humans, machines, or both.

Some embodiments of the present invention can take the form of an entirely hardware embodiment, other embodiments of the invention can take the form of an entirely software embodiment or an embodiment containing both hardware and software elements. In one embodiment, the invention is implemented in software, which includes but is not limited to firmware, resident software, microcode, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction;
   detecting a signal using at least one reader of the first outer module as the tape passes thereacross;
   moving a first guide positioned in front of the first outer module in a direction towards the tape until the signal detected by the first outer module decreases by a predetermined amount; and
   moving the first guide in a direction away from the tape to a position to set about a predetermined wrap angle of the tape relative to the first outer module after the signal detected by the first outer module decreases by the predetermined amount.

2. A method as recited in claim 1, further comprising:
   tracking the magnetic tape moving in a second direction opposite the first direction using at least one reader of the inner module of the head or a second inner module of the head, wherein the second outer module is a leading module when the tape travels in the second direction;
   detecting a signal using at least one reader of the second outer module;
   moving a second guide positioned in front of the second outer module in a direction towards the tape at least until the signal detected by the second outer module decreases by a predetermined amount; and
   moving the second guide in a direction away from the tape to a position that sets about a predetermined wrap angle of the tape relative to the second outer module after the signal detected by the second outer module decreased by the predetermined amount.

3. A method as recited in claim 1, wherein the at least one reader of the inner module includes a servo reader detecting a servo track on the tape.

4. A method as recited in claim 3, wherein the at least one reader of the first outer module includes a servo reader detecting the servo track on the tape.

5. A method as recited in claim 1, wherein the at least one reader of the inner module includes a data reader detecting a data track on the tape.

6. A method as recited in claim 1, wherein tape bearing surfaces of the outer modules lie below a plane extending across a tape bearing surface of the inner module.

7. A method as recited in claim 6, wherein the tape bearing surfaces of the outer and inner modules lie along parallel planes.

8. A method as recited in claim 6, wherein planes of the tape bearing surfaces of the outer modules are angled relative to the plane extending across the tape bearing surface.

9. A method as recited in claim 1, wherein a leading edge of the first outer module has a skiving edge.

10. A method as recited in claim 1, further comprising determining the position of the first guide when the signal has decreased by the predetermined amount.

11. A method as recited in claim 1, further comprising determining when the signal detected using the first outer module is lost when moving the first guide in the direction towards the tape, moving the first guide in the direction away from the tape after the signal is lost, and determining the position of the first guide when the signal is regained.

12. A method as recited in claim 11, wherein the tape is tracked using the at least one reader of the inner module while first guide is moved in the direction towards the tape until the signal detected by the first outer module decreases by the predetermined amount, wherein the tape is tracked using the inner module when the first guide is moved in the direction away from the tape to determine the position of the first guide when the signal is regained.

13. A method, comprising:
    tracking a magnetic tape moving in a first direction using at least one reader of an inner module of a head having at least the inner module and first and second outer modules positioned on opposite sides of the inner module and aligned with the inner module in a direction of tape travel thereacross, wherein the first outer module is a leading module when the tape travels in the first direction;
    detecting a signal using at least one reader of the first outer module as the tape passes thereacross;
    moving a first guide positioned in front of the first outer module in a direction towards the tape until the signal detected by the first outer module decreases by a predetermined amount;
    moving the first guide in a direction away from the tape to a position to set about a predetermined wrap angle of the tape relative to the first outer module after the signal detected by the first outer module decreases by the predetermined amount;

tracking the magnetic tape moving in a second direction opposite the first direction using at least one reader of the inner module of the head or a second inner module of the head, wherein the second outer module is a leading module when the tape travels in the second direction;

detecting a signal using at least one reader of the second outer module;

moving a second guide positioned in front of the second outer module in a direction towards the tape until the signal detected by the second outer module decreases by a predetermined amount; and moving the second guide in a direction away from the tape to a position that sets about a predetermined wrap angle of the tape relative to the second outer module after the signal detected by the second outer module decreases by the predetermined amount, wherein the tape bearing surfaces of the outer and inner modules lie along parallel planes.

14. A method as recited in claim 13, wherein the at least one reader of the inner module includes a servo reader detecting a servo track on the tape.

15. A method as recited in claim 14, wherein the at least one reader of the first outer module includes a servo reader detecting the servo track on the tape.

16. A method as recited in claim 13, wherein the at least one reader of the inner module includes a data reader detecting a data track on the tape.

17. A method as recited in claim 13, wherein a leading edge of the first outer module has a skiving edge.

18. A system, comprising:

hardware configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge;

the hardware comprising an output device for outputting an indication of a signal detected by the tape drive using at least one reader of the first outer module as the tape passes thereacross;

logic configured to output an indication that the signal detected by the first outer module decreases by a predetermined amount as a first guide of the tape drive positioned in front of the first outer module is moved in a direction towards the tape; and logic configured to output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

19. A computer program product, comprising:

a tangible computer readable storage medium having computer readable program code embodied therein, the computer readable program code comprising:

computer readable program code configured to communicate with logic of a tape drive that is tracking a magnetic tape moving in a first direction using at least one reader of an inner module of a head of the tape drive, the head having at least the inner module and first and second outer modules positioned on opposite sides of the inner module and aligned with the inner module in a direction of tape travel thereacross, wherein the first outer module is a leading module when the tape travels in the first direction, wherein a leading edge of the first outer module has a skiving edge;

computer readable program code configured to output an indication of a signal detected by the tape drive using at least one reader of the first outer module as the tape passes thereacross;

computer readable program code configured to output an indication that the signal detected by the first outer module decreases by a predetermined amount as a first guide of the tape drive positioned in front of the first outer module is moved in a direction towards the tape; and computer readable program code configured to output an indication that the signal detected by the first outer module increases when the first guide of the tape drive positioned in front of the first outer module is moved in a direction away the tape towards a position that sets about a predetermined wrap angle of the tape relative to the first outer module after the signal detected by the first outer module decreases by the predetermined amount.

* * * * *